April 19, 1932. R. C. NEWHOUSE 1,854,757
COOLER
Filed Dec. 21, 1928
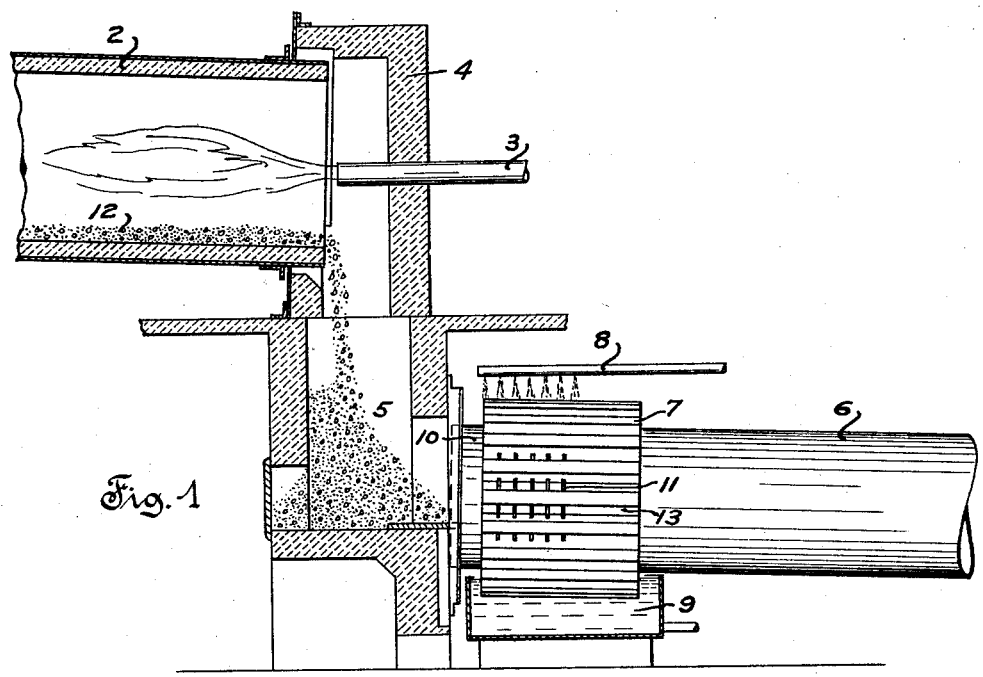
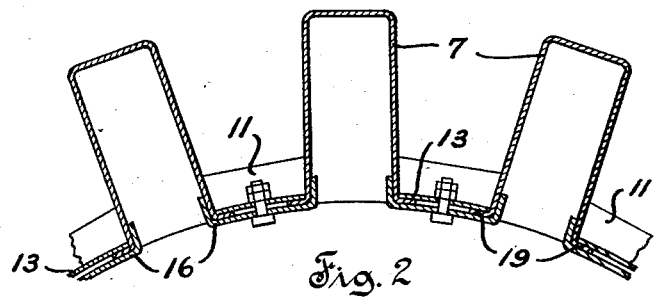
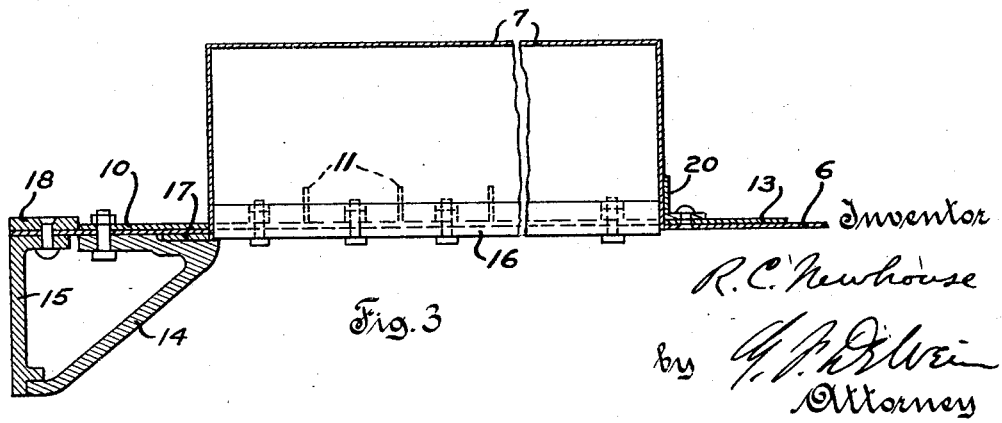

Patented Apr. 19, 1932

1,854,757

UNITED STATES PATENT OFFICE

RAY C. NEWHOUSE, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE

COOLER

Application filed December 21, 1928. Serial No. 327,632.

The present invention relates in general to improvements in the art of cooling, and relates more specifically to improvements in the construction and operation of revolving coolers especially adapted for the treatment of granular material such as cement clinker.

A general object of the invention is to provide an improved cooler for heated granular material such as cement clinker, which is simple and compact in construction and efficient in operation.

In the cement industry, the clinker delivered from the rotary kilns is in highly heated condition, and it has heretofore been customary to utilize the heat of the clinker to preheat the air admitted to the kilns, in order to increase the thermal efficiency of the latter. In order to effectively utilize the heat of the clinker for the purpose of preheating the air admitted to the kilns, it has been found desirable to shower the hot clinker through the air passing to the kilns, thereby not only more effectively heating the air, but also effecting rapid cooling of the clinker. Due to the relatively highly heated condition of the clinker leaving the kilns, the cooler structure which comes in contact with the clinker immediately after leaving the kilns, if made of metal, also becomes highly heated and corrodes rapidly. If made of fire brick or other refractory material, the cooler structure rapidly wears away, causing considerable renewal expense and objectionable delay in operation. This is especially true if it is attempted to form the showering structure from refractory material, and such formation also introduces undesirable obstruction in the cooler.

It is a more specific object of the present invention to provide a simple cooler structure which will effectively preheat the air entering the kilns, but which may also be readily maintained in relatively cool condition. Another specific object of the present invention is to provide a cooler having simple and highly effective means for showering granular material within the cooler, together with instrumentalities for preventing destruction of the showering means due to high temperatures. It is still a further specific object of the invention to provide an effective rotary cooler which may be formed entirely of metal and which introduces minimum objectionable obstruction to the flow of air therethrough.

These results are attained primarily by providing means for effectively cooling the showering structure of a rotary cooler, at a time when this structure is not exposed directly to the air which is being preheated, thereby preventing chilling of the air while at the same time maintaining the cooler structure at a sufficiently low temperature to prevent rapid destruction thereof. In accordance with the invention the entire cooler structure is formed of plate steel or similar material, and the metal is prevented from becoming undesirably hot with the aid of external cooling means which not only effectively reduces the temperature of the metallic walls of the cooler, but also slightly cools the material directly in contact with these walls and thereby prevents objectionable corrosion of metal.

A clear conception of an embodiment of the invention and of the mode of constructing and of operating coolers built in accordance therewith, may be had by referring to the drawings accompanying and forming a part of this specification wherein like reference characters designate the same or similar parts in the several views.

Fig. 1 is a fragmentary part sectional side elevation of a combined rotary kiln and cooler, showing one form of the improvement applied to the cooler.

Fig. 2 is an enlarged fragmentary transverse section through the inlet portion of the rotary cooler.

Fig. 3 is an enlarged fragmentary longitudinal section through the inlet portion of the rotary cooler.

Referring specifically to Fig. 1 of the drawings, the tubular kiln 2 is rotatable about a slightly inclined but substantially horizontal axis, and is adapted to deliver hot granular material 12 commonly known as clinker, by gravity through a firing hood 4 to a receptacle 5 located directly below the firing hood. The rotary kiln 2 is fired by means of a burner 3 of well known construction, and the receptacle 5 may be provided with a lateral opening communicating directly with the inlet end of a rotary cooler 6 of the drum type which is likewise rotatable about a slightly inclined but substantially horizontal axis. The material 12 is advanced through the kiln 2 and through the cooler 6 in succession, by virtue of the continuous rotation and slight inclination of the axes of these elements. The rotary kiln 2, the firing hood 4 and the receptacle 5 may be lined with refractory material for the purpose of effectively resisting the intense heat to which these parts are subjected.

In the specific embodiment of the invention illustrated in the drawings, the inlet end of the rotary cooler 6 is of improved construction, comprising an annular series of substantially parallel radially disposed pockets 7 extending outwardly from the periphery of the cooler drum and being in open communication with the interior thereof. The pockets 7 as well as the remainder of the cooler 6 are preferably formed of sheet metal, and each of the pockets 7 may be provided with flanges 19 for securing the pockets in place. Disposed between the successive pockets 7 and rigidly attached to the drum of the cooler 6 at one end and to supporting structure at the other end, is a series of substantially parallel spacing and retaining plates 13. These plates 13 coact directly with the outer surfaces of the flanges 19 of the pockets 7. The ends of the plates adjacent to the inlet end of the cooler 6 coact with a tapered ring 14 and with an end ring 15 as shown in Fig. 3, being rigidly attached to these ring elements. The opposite ends of the plates 13 are rigidly attached directly to the cooler drum beyond the ends of the pockets 7. A securing ring 17 coacting with the tapered ring 14 may be provided for the purpose of intimately uniting the successive plates 13, and a plate steel ring 10 may also engage the outer surfaces of the inlet ends of the plates 13. The extreme ends of the plates 13 may be attached to the outer surface of the end ring 15 by means of a strap 18. The ends of the pockets remote from the annular inlet may be additionally secured to the plates 13 by means of angle bars 20. U-shaped retaining plates 16 may be provided within the cooler 6 adjacent to the pocket flanges 19, as shown in Fig. 2, and all of the coacting sheet metal elements may be rigidly united by riveting and welding so as to provide an exceedingly rigid structure.

Located between the successive pockets 7 and lying in planes substantially perpendicular to the cooler axis, is a series of flow retarding fins or dams 11, these dams serving to prevent the flow of liquid along the cooler 6 beyond the lower ends of the pockets 7. Beneath the cooler 6 is located a liquid basin 9, this basin being so disposed that the successive pockets 7 will travel through the liquid therein during rotation of the cooler. In addition to the liquid basin 9, a cooling water spray pipe 8 may be provided above the pockets 7, but this spray is not an essential part of the present invention and may be omitted.

In actual practice, the interior of the portion of the cooler 6 beyond the pockets 7, may also be provided with lifter plates for elevating and showering material passing through the cooler, through the air current passing upwardly therethrough toward the kiln 2. The inlet end of the cooler 6 should preferably be sealed against free entry of air without passing through the interior of the cooler 6, and additional air admission means may be provided in the firing hood 4, if the quantity of air admitted to the kiln 2 through the cooler 6 is insufficient.

During normal operation of the kiln 2, the granular material 12 is delivered in highly heated condition into the receptacle 5 and flows by gravity into the inlet end of the rotating cooler 6. The tapered ring 14 conducts the hot clinker directly into the pockets 7 which by virtue of the rotation of the cooler elevate the admitted material and eventually precipitate or shower the same across the axis of the cooler. Air is flowing upwardly through the cooler 6 and into the rotary kiln 2, and as this air comes in contact with the shower of hot material, it is quickly heated and simultaneously quickly reduces the temperature of the granular material 12. Due to the extremely heated condition of the granular material upon entering the cooler 6, the walls of the cooler and of the pockets 7 tend to become extremely hot. In order to prevent overheating of the sheet metal pockets 7, they are caused to travel successively through the cooling liquid in the basin 9, and may be additionally subjected to spray cooling from one or more spray pipes 8. This external cooling of the pockets not only reduces the temperature of the cooler walls, but also somewhat reduces the temperature of the material directly in contact with these walls, thereby providing a sheet of insulation which protects the cooler walls. If the spray cooling is utilized, it is preferable to provide fins or dams 11 as shown in the drawings, in order to prevent cooling liquid from flowing along the cylindrical portion of the cooler 6.

From the foregoing description, it will be apparent that the annular series of pockets 7 provides simple and effective means for showering the granular material across the cooler drum in order to preheat the air passing to the kiln 2. The cooling basin 9 effectively maintains the temperature of the sheet metal pockets sufficiently low to prevent undesirably rapid corrosion thereof. By locating the basin 9 beneath the coller 6 so that the cooling liquid engages the external surfaces of the pockets only while these pockets are receiving the material, undesirable chilling of the air, is avoided. The pocket structure shown in the drawing may be conveniently manufactured from commercial plate steel and the parts may be effectively united by riveting and welding so as to produce an extremely rigid assemblage.

It may in some cases be desirable to make the pockets 7 of modified shape, but the important feature is the location of the pockets externally of the drum and the provision of means for maintaining these pockets in relatively cool condition. The arrangement of pockets specifically shown, wherein the pockets 7 extend longitudinally of the cooler drum, may be readily constructed, but in any event, it is desirable to permit free escape of air from between the successive pockets so that the cooling liquid is not prevented from coming in contact with the surfaces of these pockets by virtue of confined air. It is also desirable to have the pockets immersed in the cooling liquid at the time of admission of the heated granular material thereto (so that the material initially admitted will be somewhat cooled and provide an insulating lining between the metal and the other material admitted, for the purposes previously referred to.

It should be understood that it is not desired to limit the invention to the exact details of construction and operation herein shown and described, for various modifications within the scope of the claims may occur to persons skilled in the art.

It is claimed and desired to secure by Letters Patent:

1. In combination, a series of pockets movable in succession to receive, elevate and subsequently shower material toward other pockets of said series, and a basin containing cooling liquid through which the successive pockets are movable while receiving said material.

2. In combination, an annular series of pockets revolvable about an axis, means for admitting heated material to the interior of said pockets in succession, and a basin containing cooling liquid through which the successive pockets are movable during admission of material thereto.

3. In combination, a drum rotatable about an axis, means for elevating and showering material across the interior of said drum, and a basin containing liquid for cooling said showering means when in its lowermost position.

4. In combination, a rotary drum, a series of imperforate pockets radiating beyond the periphery of said drum, means for introducing fluent material into said pockets through said drum, and means for externally cooling said pockets by applying cooling liquid to the exterior thereof.

5. In combination, a rotary drum, a series of pockets formed to shower material across said drum during rotation thereof, and a liquid basin through which said pockets are successively movable during said rotation.

6. In combination, a rotary drum, a series of external pockets radiating from the periphery of said drum, said pockets being in open communication with the interior of said drum, and a liquid basin located below said drum in the path of movement of said pockets.

7. In combination, a drum rotatable about a substantially horizontal axis, an annular series of substantially parallel pockets radiating from the periphery of said drum, said pockets being in open communication with the interior of said drum and being formed to precipitate fluent material across the drum axis, and a liquid basin located below said drum in the path of movement of said pockets.

8. In combination, a drum rotatable about a substantially horizontal axis, an annular series of substantially parallel pockets radiating outwardly from the periphery of said drum, said pockets being in open communication with the interior of said drum and being formed to shower material passing through said drum across the axis thereof, and a cooling liquid basin into which the successive pockets dip during rotation of said drum.

9. In combination, a drum rotatable about a substantially horizontal axis, an annular series of substantially parallel laterally spaced pockets radiating from the periphery of said drum, the spaces between said pockets being open adjacent to the ends thereof, and a liquid basin located below said drum in the path of movement of said pockets.

10. In combination, an annular series of laterally spaced pockets radiating from and rotatable about an axis, and a liquid basin located in the path of movement of said pockets, the ends of the space between said pockets being open to permit air to escape freely from said spaces during immersion of said pockets.

11. A construction of the class described comprising, a revolving chamber having at least one imperforate, material-receiving pocket projecting outwardly from and opening through the periphery thereof and adapted and arranged to receive a hot material when at a low point, elevate and subsequently shower said received material across said chamber as the chamber is revolved, and means for applying a cooling liquid to the exterior of said pocket.

In testimony whereof, the signature of the inventor is affixed hereto.

RAY C. NEWHOUSE.